United States Patent
Winn, Jr. et al.

[11] Patent Number: 5,230,363
[45] Date of Patent: Jul. 27, 1993

[54] SUCTION VALVE FOR HIGH PRESSURE SLURRY PUMP

[75] Inventors: Fred M. Winn, Jr.; Donald C. Cameron, both of Tulsa; Larry J. Leising, Broken Arrow, all of Okla.

[73] Assignee: Dowell Schlumberger Incorporated, Tulsa, Okla.

[21] Appl. No.: 683,227

[22] Filed: Apr. 10, 1991

[51] Int. Cl.⁵ .............................. F16K 15/08
[52] U.S. Cl. ..................... 137/512.3; 137/516.15; 137/516.29; 417/571
[58] Field of Search ............ 417/571; 137/512.3, 137/516.15, 516.29

[56] References Cited

U.S. PATENT DOCUMENTS

| | | | |
|---|---|---|---|
| Re. 14,424 | 1/1918 | Scoville | 137/516.29 X |
| 3,058,487 | 10/1962 | Helling | 137/516.29 X |
| 3,309,014 | 3/1967 | Bauer | 417/571 X |
| 4,412,792 | 11/1983 | Laborde | 137/516.29 X |
| 4,616,983 | 10/1986 | Hanafi | 417/571 |
| 5,037,276 | 8/1991 | Tremoulet | 137/512.3 X |

Primary Examiner—Robert G. Nilson
Attorney, Agent, or Firm—Stephen A. Littlefield

[57] ABSTRACT

Where on the valve seating surfaces due to the high pressure pumping of abrasive slurry through an in-line valve is greatly reduced by providing first and second valve seating surfaces which are engaged, respectively by first metal and first elastomeric closure surfaces and second metal and elastomeric closure surfaces located on an annular valve closure means. Pumping efficiency is maintained by providing for high velocity sweep in an annular space between the annular valve closure means and the cylinder in which it rides.

4 Claims, 2 Drawing Sheets

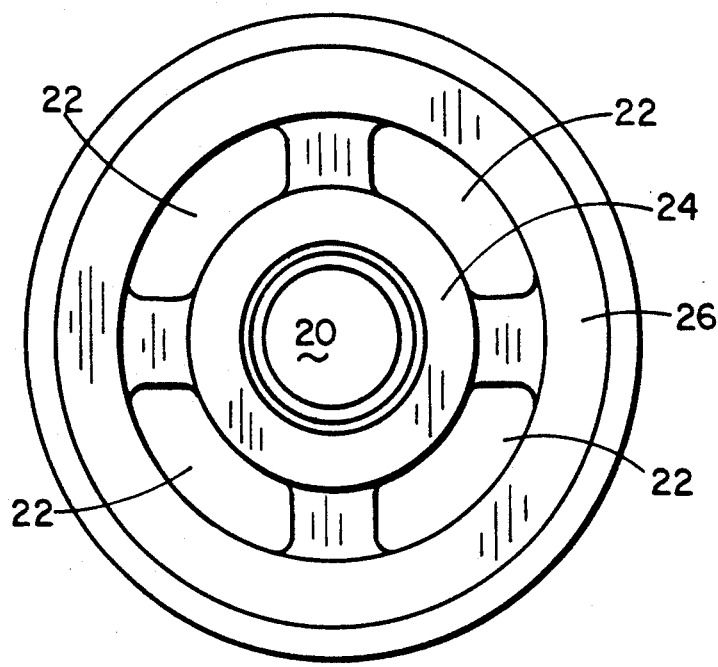
Fig. 2
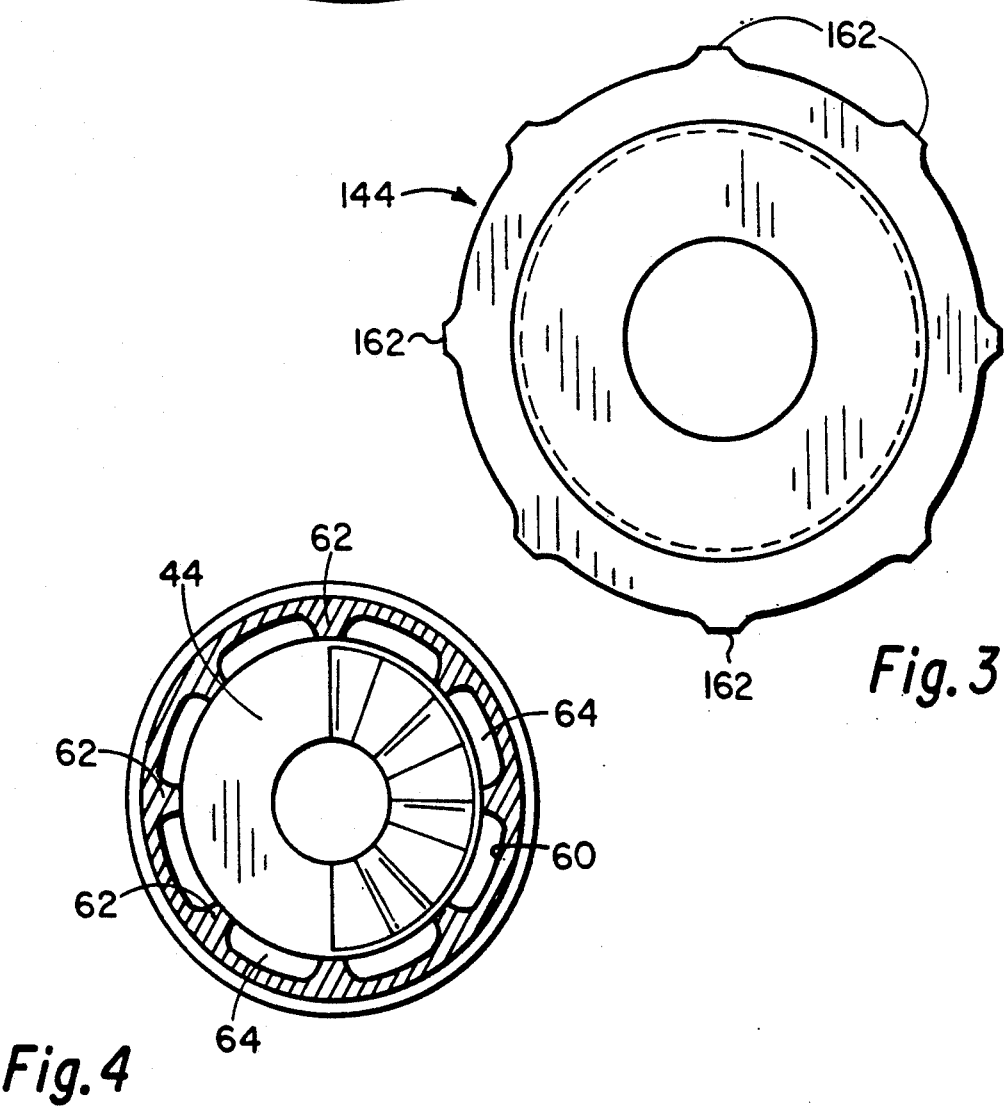
Fig. 3
Fig. 4

SUCTION VALVE FOR HIGH PRESSURE SLURRY PUMP

This invention relates to the art of high pressure pumps, and more particularly, to a low wear valving arrangement for high pressure pumps used to pump slurried abrasive materials.

BACKGROUND OF THE INVENTION

In well service operations such as well cementing, fracturing and gravel packing, it is necessary to pump fluid slurries containing high loadings of abrasive materials such as and, gravel and/or cement under high pressures into a wellbore. In order to attain the required pressures in pumping such slurries which may be upwards of 20,000 psi in a well fracturing operation with sand loadings of as much as 20 lbs per gallon of fluid, high pressure piston-type of pumps are used. So-called triplex pumps incorporating three pistons or plungers whose pumping strokes effectively balance the discharge pressure are typical of such pressure pumps used in oilfield service operations of this type.

Common triplex pumps for high pressure oilfield service operation typically employ a valving arrangement wherein the valves are located on opposite sides of the pumping chamber along a cross-bore axis which is normal to the stroke axis of the pump plungers. The service life of such a pump and valve arrangement is somewhat limited, however, since there is a high pressure fatigue stress concentration at the juncture of the plunger bore with the transversely oriented valves in the cylinder head.

In an effort to avoid these high stress concentration which limit the service life of such pumps, an in-line valve arrangement such as is used in high pressure water pumps has been tried. With an in-line valve pump, the valve head comprises a central discharge port located along the longitudinal axis of the plunger with annular inlet ports located radially outwardly of the discharge port having valve seating surfaces located both between the discharge port and the annular inlet ports and radially outwardly of the inlet ports.

The discharge port is provided with a check valve which may comprise a ball or disc-type check valve having spring means which, along with back pressure from adjacent cylinders, biases the check valve to the closed position. Similarly, the in-let ports are closed by an annular disc engaging the seating surfaces of the valve head and having a central opening therethrough for passage of fluid into the discharge port when the inlet or suction valve disc is in the closed position. The suction valve disc is biased in the closed position by spring means.

The difficulty with the use of an in-line valve such as used in the pumping of water is the substantial amount of wear on the suction valve and seating surfaces when pumping high pressure slurries containing relatively large amounts of highly abrasive particles such as sand, gravel or cement. The seating surfaces on both the valve head and the valve disc are quickly eroded thereby quickly decreasing the pumping efficiency and the high pressure pumping ability of the pump.

An additional problem with prior in-line valve design with the pumping of high-solids slurries is the build-up of solids within the pumping chamber because the flow characteristics of the disc closure valve do not permit high sweeping efficiency to clear solids from the pump chamber. Increased wear and lower pumping efficiencies result from solids retention within the pump chamber.

SUMMARY OF THE INVENTION

The present invention provides for greatly decreased wear on the suction valve disc seating surfaces as well as providing for efficient sweeping of the pump chamber to avoid solids retention therein.

In accordance with the invention, an in-line valve has a valve body having a longitudinal axis and includes a discharge port with a check valve closure located centrally within the valve body along its longitudinal axis. At least one annular inlet port is located radially outwardly of the discharge port and includes first metal valve seating means located between the inlet and discharge ports and second metal valve seating means located radially outwardly of the inlet port. The improvement of the invention comprises valve closure means having a first annular metal closure surface and a first annular elastomeric closure surface for sealing engagement with the first metal seating surface and a second annular metal closure surface and a second annular elastomeric closure surface for sealing engagement with the second metal seating surface.

Further in accordance with the invention, one of the above valve closure means or a cylindrical bore in the valve body includes guide means which engages the other of the cylindrical bore or the valve closure means and creates at least three partial annular high velocity fluid passages between the cylindrical bore and an outer cylindrical surface of the valve closure means.

It is therefore an object of this invention to provide a suction valve closure means which offers effective sealing of metal to metal contact with a valve seating surface as well as improved wear characteristics through the use of elastomeric seals.

It is yet another object of this invention to provide high velocity flow passages within a pump chamber which effectively sweep abrasive particles from the pump chamber avoiding solids build-up within the pump chamber.

BRIEF DESCRIPTION OF THE DRAWINGS

These and other objects of the invention are accomplished through the manner and the form of the present invention to be described in further detail hereinafter in conjunction with the accompanying drawings forming a part of this specification and in which:

FIG. 2 is a plan view of the inlet and discharge ports and the accompanying valve seating surfaces on the valve body used in accordance with the present invention;

FIG. 3 is a plan view of a preferred valve closure means in accordance with the present invention; and FIG. 4 illustrates an alternative valving arrangement in accordance with a second embodiment of the present invention.

DETAILED DESCRIPTION OF THE PREFERRED EMBODIMENTS AND THE DRAWINGS

Figure 1:
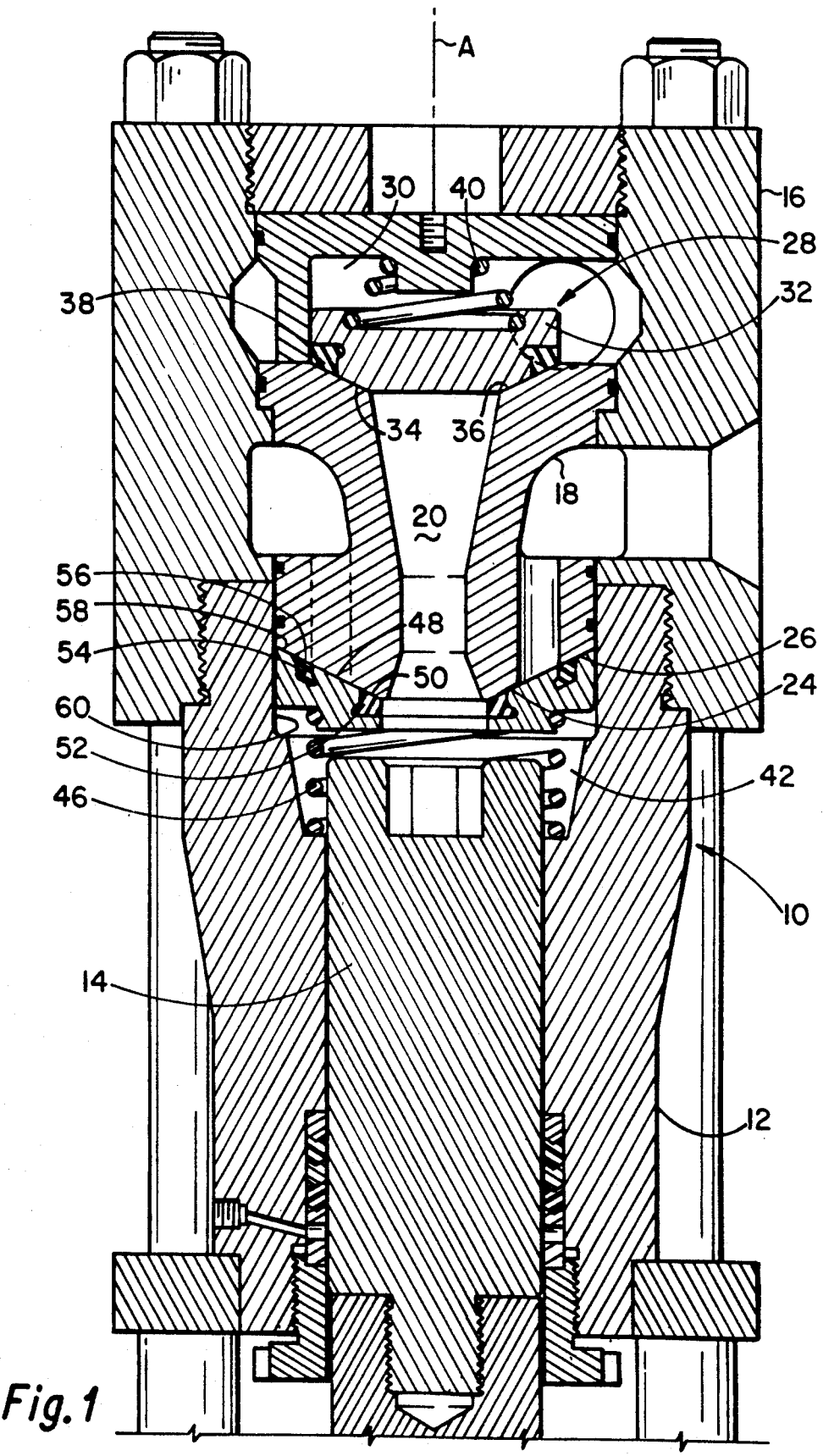
FIG. 1 illustrates a cross-sectional view of an in-line valve employing the suction valve closure means of the present invention.

The invention will now be described in a more limited aspects of a preferred embodiment thereof. Referring now to the drawings, FIG. 1 shows a single cylinder portion of a high pressure pump 10 having a plunger cylinder 12 and a reciprocating plunger 14 movable along a longitudinal axis A within the plunger cylinder 12.

A cylinder head 16 includes a valve body 18 having a central discharge port 20 centered along the longitudinal axis A and a plurality of partial annular inlet ports 22 (FIG. 2) located radially outwardly from the central discharge port 20. The valve body 18 may be of cast or machined metal composition and preferably has hardened surfaces to reduce wear.

A first metal valve seating surface 24 is located annularly between the central discharge port 20 and the plurality of inlet ports 22. Similarly, a second metal valve seating surface 26 is located radially outwardly of the inlet ports 22.

The cylinder head 16 further includes a discharge valve 28 disposed in a discharge chamber 30 at the outer end of the central discharge port 20. The discharge valve comprises a valve disc member 32 having a valve seating surface 34 in engagement with a seating surface 36 on the valve body 18. In the preferred embodiment shown in FIG. 1, the discharge valve disc 32 further includes an annular elastomeric seal 38 located on the valve seating surface 34 in engagement with the seating surface 36 of the valve body 18. A spring member 40 acts to bias the discharge valve 28 in the closed position.

The opening and closing of the inlet ports 22 into the plunger chamber 42 is controlled by the opening and closing of an annular valve closure means 44 which is biased into the closed position by spring means 46. In accordance with the invention, the annular valve closure means 44 includes a first metal closure surface 48 and first elastomeric closure surface 50 effected by an annular elastomeric ring 52 which first metal and elastomeric closure surfaces 48, 50 are in sealing engagement with the first metal valve seating surface 24 when the valve is in the closed position. Similarly, the second annular elastomeric ring 54 disposed radially outwardly from the first annular elastomeric ring 52 presents a second elastomeric closure surface 56 in sealing engagement with the second metal valve seating surface 26 which seating surface 26 is also in metal to metal sealing engagement with a second metal closure surface 58 of the valve closure means 44. In the preferred embodiment shown in FIG. 1, the first elastomeric closure surface 50 is located on the radially inward edge of the annular valve closure means 44 with the first metal closure surface located adjacent thereto, radially inwardly of the inlet port 22. The second metal closure surface 58 is located on the radially outward edge of the annular valve closure means 44 with the second elastomeric closure surface being located radially inwardly thereof adjacent to the radially outward edge of the inlet port 22. It will be understood, however, that other positionings of the first and second metal closure surfaces and first and second elastomeric closure surfaces may be used so long as both elastomeric and metal closure surfaces are in engagement with each of the first and second metal valve seating surfaces 24, 26.

In accordance with one preferred embodiment of the invention, the annular valve closure means 44 is somewhat spaced from and guided from within a cylindrical wall 60 located within the plunger 42 in order to provide annular flow passage between the annular valve closure means 44 and the cylindrical wall 60. In accordance with one preferred embodiment of the invention shown in FIG. 4, the cylinder wall 60 includes a plurality of radially inwardly extending guide flutes 62 which act to centralize the closure means 44 within the cylinder. The guide flutes 62 act to divide the annular space between the valve closure means 44 and the cylindrical wall 60 into a plurality of partial annular flow passages 64. These partial annular flow passages 64 act as areas of greatly increased fluid flow velocity when the suction valve is in the open position, the flow velocity effective to sweep the plunger chamber 42 thereby avoiding the build-up of solid residues which can effect pump efficiency and wear.

As an alternative to providing a fluted cylindrical wall surface as shown in FIG. 4, an annular valve closure means 144 (FIG. 3) may be provided with a plurality of radially outwardly extending guide lugs 162 which engage a smooth bore cylinder wall (not shown) to guide the movement of the valve and to divide the annular flow passages into a plurality of high velocity flow passages similar to that shown in FIG. 4 as will be clearly understood by those skilled in the art.

While the invention has been described in the more limited aspects of a preferred embodiment thereof, other embodiments have been suggested and still others will occur to those skilled in the art upon a reading and understanding of the foregoing specification. It is intended that all such embodiments be included within the scope of this invention as limited only by the appended claims.

Having thus described out invention, We claim:

1. An in-line valve having a valve body and a longitudinal axis, a discharge port including check valve closure means located centrally within said valve body along said longitudinal axis, a plurality of annularly arranged inlet ports located radially outwardly of said discharge port, first metal valve seating means located annularly between said inlet and discharge port and second metal valve seating means located radially outwardly of said inlet port, valve closure means having a first annular metal closure surface and a first annular elastomeric closure surface for sealing engagement with said first metal seating surface and a second annular metal closure surface and a second annular elastomeric closure surface for sealing engagement with said second metal seating surface, further including radially extending guide means located on one of said valve closure means and a cylindrical bore, said guide means in engagement with other of said cylindrical bore and said valve closure means.

2. The improvement as set forth in claim 1 further including spring means biasing said valve closure means to a closed position.

3. The improvement as set forth in claim 1 wherein said guide means comprises radially outwardly extending lugs located on a cylindrical outer surface of said valve closure means.

4. The improvement as set forth in claim 1 wherein said guide means comprises a plurality of radially inwardly extending flutes in engagement with a cylindrical outer surface of said valve closure means.

* * * * *